United States Patent
Linsky et al.

(10) Patent No.: US 11,121,820 B2
(45) Date of Patent: Sep. 14, 2021

(54) MEDIA ACCESS CONTROLLER WITH A CODEC ERROR MODEL

(71) Applicant: QUALCOMM Incorporated, San Diego, CA (US)

(72) Inventors: Joel Linsky, San Diego, CA (US); Richard Turner, Belfast (GB); Laurent Wojcieszak, Belfast (GB)

(73) Assignee: QUALCOMM INCORPORATED, San Diego, CA (US)

( * ) Notice: Subject to any disclaimer, the term of this patent is extended or adjusted under 35 U.S.C. 154(b) by 109 days.

(21) Appl. No.: 16/681,404

(22) Filed: Nov. 12, 2019

(65) Prior Publication Data
US 2021/0143940 A1    May 13, 2021

(51) Int. Cl.
*H04J 3/00*       (2006.01)
*H04L 1/16*       (2006.01)
*H04L 5/00*       (2006.01)
*H04W 72/08*      (2009.01)

(52) U.S. Cl.
CPC .......... *H04L 1/1678* (2013.01); *H04L 1/1621* (2013.01); *H04L 5/0055* (2013.01); *H04W 72/085* (2013.01)

(58) Field of Classification Search
None
See application file for complete search history.

(56) References Cited

U.S. PATENT DOCUMENTS

| 2009/0086657 A1* | 4/2009 | Alpert | H04L 1/1838 370/310 |
| 2011/0185248 A1* | 7/2011 | Linskey | H04L 1/1845 714/748 |
| 2014/0219216 A1* | 8/2014 | Lee | H04L 1/1825 370/329 |
| 2019/0089490 A1 | 3/2019 | Linsky et al. | |
| 2019/0342926 A1* | 11/2019 | Deng | H04K 3/84 |
| 2020/0221480 A1* | 7/2020 | Li | H04W 74/08 |

FOREIGN PATENT DOCUMENTS

WO    2011090680 A1    7/2011

OTHER PUBLICATIONS

International Search Report and Written Opinion—PCT/US2020/053231—ISA/EPO—Dec. 8, 2020.

* cited by examiner

*Primary Examiner* — Phirin Sam
(74) *Attorney, Agent, or Firm* — Muncy, Geissler, Olds & Lowe, P.C.

(57) ABSTRACT

Examples herein include apparatus and methods for overriding a media access control module acknowledgment and non-acknowledgment scheme. In one example, a codec module determines if an error-corrected packet is acceptable in response to the detection by the media access module of an uncorrectable error in a received packet, and overrides the media access control module to prevent a non-acknowledgment response from being sent when the error-corrected packet is acceptable.

20 Claims, 8 Drawing Sheets

MEDIA ACCESS CONTROLLER WITH A CODEC ERROR MODEL

FIELD OF DISCLOSURE

This disclosure relates generally to streaming data, and more specifically, but not exclusively, to media access controllers for receiving streaming data.

BACKGROUND

Media access control (MAC) is a sublayer of the data link layer (DLL) in the seven-layer OSI network reference model. The MAC sublayer is the layer that controls the hardware responsible for interaction with the wired, optical or wireless transmission medium. The MAC sublayer and the logical link control (LLC) sublayer together make up the data link layer. Within the data link layer, the LLC provides flow control and multiplexing for the logical link (i.e. EtherType, 802.1 Q VLAN tag etc.), while the MAC provides flow control and multiplexing for the transmission medium.

These two sublayers together correspond to layer 2 of the OSI model. Within the hierarchy of the OSI model and IEEE 802 standards, the MAC sublayer provides a control abstraction of the physical layer such that the complexities of physical link control are invisible to the LLC and upper layers of the network stack. Thus any LLC sublayer (and higher layers) may be used with any MAC. In turn, the medium access control block is formally connected to the PHY via a media-independent interface.

When sending data to another device on the network, the MAC sublayer encapsulates higher-level frames into frames appropriate for the transmission medium (i.e. the MAC adds a syncword preamble and also padding if necessary), adds a frame check sequence to identify transmission errors, and then forwards the data to the physical layer as soon as the appropriate channel access method permits it. For topologies with a collision domain (bus, ring, mesh, point-to-multipoint topologies), controlling when data is sent and when to wait is necessary to avoid collisions. Additionally, the MAC is also responsible for compensating for collisions by initiating retransmission if a jam signal is detected. When receiving data from the physical layer, the MAC block ensures data integrity by verifying the sender's frame check sequences, and strips off the sender's preamble and padding before passing the data up to the higher layers. However, there is also a higher error rate on the air than on a wire, so a higher chance of packets being corrupted. Because of that, most MAC protocols also implement positive acknowledgement and MAC level retransmissions to avoid losing packets on the air—a MAC acknowledgement scheme.

The principle is quite simple: each time a device receives a packet, the device sends back immediately a short message (an ack) to the transmitter to indicate that it has successfully received the packet without errors. If after sending a packet the transmitter does not receive an ack, the transmitter knows that the packet was lost, so the transmitter will retransmit the packet (after contending again for the medium, similar to Ethernet). Most MAC protocols use a stop and go mechanism; they transmit the next packet of the queue only if the current packet has been properly acknowledged (no sliding window mechanism like in transmission control protocol. The rationale is that it makes the protocol simpler, minimize latency and avoid de-sequencing packets.

Normally the MAC acknowledgement scheme does not acknowledge the packet until the number of bit errors has reduced to zero and there is a good cyclic redundancy check (CRC). As a result, the source will keep sending packets until the maximum retries have been reached and therefore quickly using the bandwidth available. A wireless channel can suffer periods of fading that reduces the bandwidth it can support. If more bandwidth is required than the channel can support, it will increase the channel latency and it will also affect the Quality of Service (QoS) of other communication links sharing the same controller. When low latency audio is required any extra delay can cause audio dropout. Typically, there is a lag between the time the source will encode a packet of audio to when is it sent across the wireless medium. This lag makes it hard for the source to reduce the bit rate of the encoded stream to match the instantaneous available bandwidth.

Accordingly, there is a need for systems, apparatus, and methods that overcome the deficiencies of conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a communication device comprises: a control unit, the control unit comprises: a media access control (MAC) module configured to send a non-acknowledgment response that requests a retransmission of a second packet received over a synchronous link of a wireless communication medium in response to a detection of a second uncorrectable error in the second packet received via the synchronous link; a majority vote module configured to, in reaction to the detection of the second uncorrectable error in the second packet, perform a majority vote with respect to the second packet and a first packet received with a first uncorrectable error prior to receipt of the second packet to generate an error-corrected packet; and a codec module configured to, in response to the detection of the second uncorrectable error in the second packet, determine if the error-corrected packet is acceptable; wherein when the error-corrected packet is acceptable, the codec module overrides the MAC module to prevent the response from being sent and configures the MAC module to send an acknowledgment response.

In another aspect, a communication device comprises: a control unit, the control unit comprises: means to control a media access control (MAC) layer configured to send a non-acknowledgment response that requests a retransmission of a second packet received over a synchronous link of a wireless communication medium in response to a detection of a second uncorrectable error in the second packet received via the synchronous link; means to combine packets configured to, in reaction to the detection of the second uncorrectable error in the second packet, perform a majority vote with respect to the second packet and a first packet received with a first uncorrectable error prior to receipt of the second packet to generate an error-corrected packet; and means to compress/decompress configured to, in response to the detection of the second uncorrectable error in the second packet, determine if the error-corrected packet is acceptable; wherein when the error-corrected packet is acceptable, the means to compress/decompress overrides the means to control the MAC layer to prevent the response from being sent and configures the means to control the MAC layer to send an acknowledgment response.

In still another aspect, a method for acknowledging a packet comprises: detecting, with a media access control (MAC) module, a second uncorrectable error in a second packet received via a synchronous link of a wireless communication medium; performing, with a majority vote module, a majority vote with respect to the second packet and a first packet received with a first uncorrectable error prior to receipt of the second packet to generate an error-corrected packet in reaction to the detection of the second uncorrectable error in the second packet; determining, with a codec module, if the error-corrected packet is acceptable in reaction to the detection of the second uncorrectable error in the second packet; overriding, with codec module, the MAC module to prevent the response from being sent when the error-corrected packet is acceptable; and sending, by the MAC module, an acknowledgment response when the error-corrected packet is acceptable.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
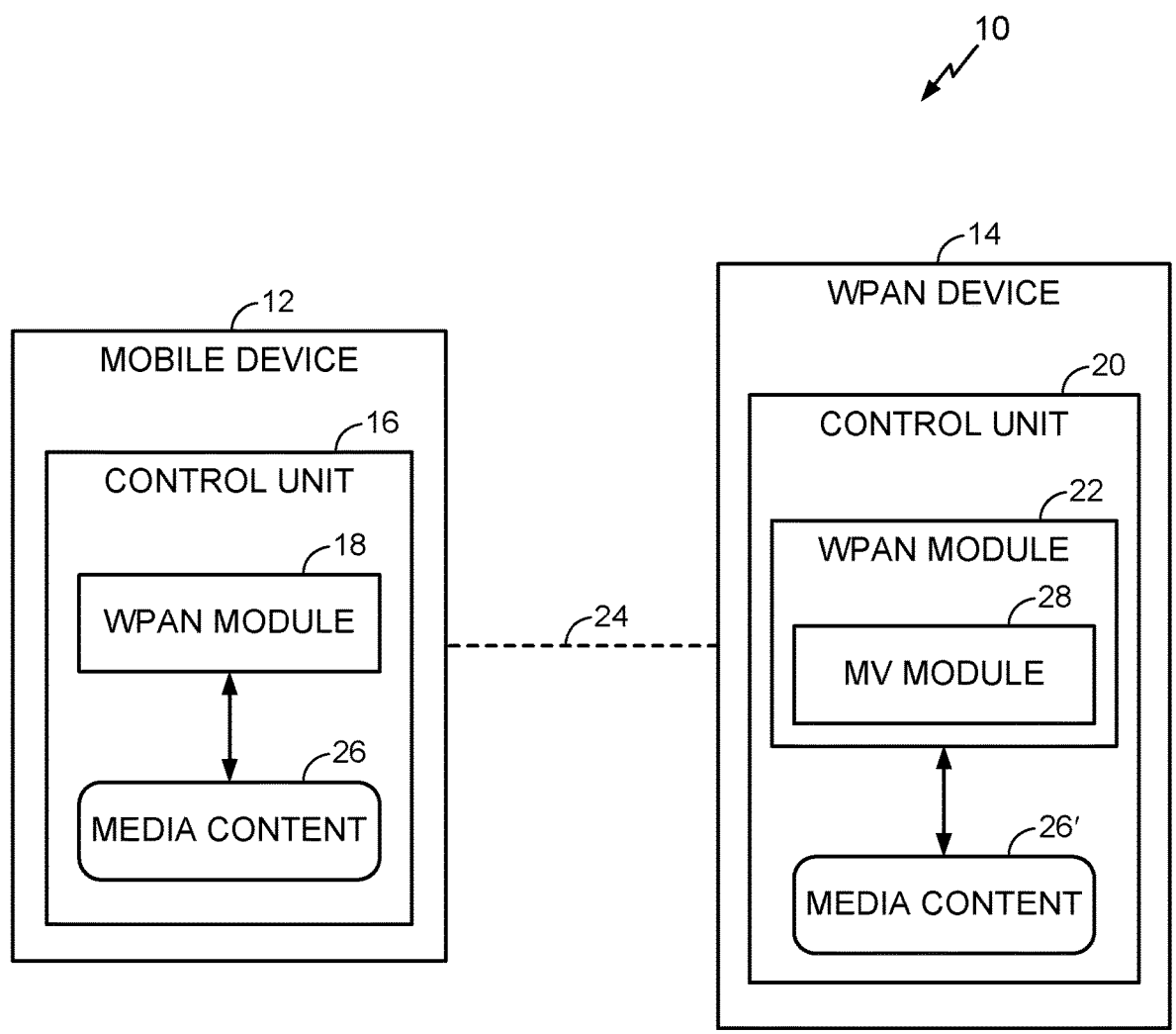
FIG. 1 illustrates an exemplary block diagram of two communication devices in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. A MAC may include a codec that is designed to be tolerant to bit errors that allows the MAC acknowledgement scheme to consider codec packets as "good" based on an error model of the codec. In other words, the codec may override a MAC layer acknowledgment scheme to preserve bandwidth. For instance, a bit error may not have an effect or at worst have a small effect on the audio. This has an advantage in minimizing retransmissions that, in many cases, may be simply trying to get that last bit corrected. For example, after receiving two packets, if the number of errors is small then there is no need to wait for a third packet. In addition, audio quality can be traded off against the wireless link bandwidth (bandwidth usually reserved for packet repeat) by allowing more bit errors to be kept in the stream fed to the codec. This improves the latency that can be achieved but also the stability of the communication links.

A wireless communication specification, standard or protocol, referred to as Bluetooth™, implements wireless communication using a specific type of spread spectrum data communication referred to as a "frequency-hopping" spread spectrum. This frequency-hopping spread spectrum divides the data being communicated over the wireless communication medium into discrete portions and transmits each of these portions as a signal of up to 79 different frequencies. Typically, Bluetooth communication supports a maximum transmission distance of 10 meters, which is about 30 feet. Bluetooth™ communication further provides for synchronous connection oriented links (referred to as "SCO" in the Bluetooth™ specification), where a first device connects (or "pairs" in the terminology of the Bluetooth™ specification) with a second device. The connection is synchronous in that the two devices synchronize, time-wise, data communications between each other to permit transmission of data for time-sensitive or time-bounded applications, such as voice applications including Voice over Internet Protocol (VoIP) and more standard, cellular telephone calls.

In later revisions to the Bluetooth™ specification, another form of link referred to as an extended synchronous connection oriented links (referred to as "eSCO" in the Bluetooth™ specification) was defined to improve upon SCO. SCO did not allow retransmission of communications in response to detecting an error in these transmissions and instead provided only limited forms of error correction. Failing error correction, SCO replaced the erroneous data communication with a special communication that in effect defined silence. eSCO improved upon SCO by enabling retransmission of those erroneous data communications that could not be remedied through the limited forms of error correction. For practical purposes, eSCO limited retransmission to two distinct retransmissions of the erroneous data communication.

In accordance with one aspect of the techniques of this disclosure, a first device, such as a Bluetooth™ headset, implements the eSCO aspect of the Bluetooth™ specification or protocol to request one or more retransmissions of a data communication received over an eSCO link between the headset and a second device, such as a cellular or mobile phone. The headset therefore receives a first packet (or communication) over the eSCO link and performs error detection to determine whether the first packet includes an error. If the first packet includes an error, the headset may first attempt to correct the error. Assuming, however, that the error cannot be corrected, the headset requests a first retransmission of the first packet received over the wireless communication medium, e.g., the eSCO link, in response to detecting the error in the first packet.

The headset then receives another, or second, packet in response to this first requested retransmission. The headset determines whether the second packet received in response to the first retransmission request includes an error. In response to detecting another such uncorrectable error in the second packet, the headset, rather than replace the second packet in an output buffer with the special communication designating silence or otherwise perform packet loss concealment, performs a bit-wise majority vote on corresponding bits of the first and second packets to generate at least a partially error-corrected packet. The headset performs the bit-wise majority vote by comparing, for example, the first bit of a payload of each of the first and second packets, which for illustrative purposes may comprise bit values of 1 and 1, respectively. As the two 1's form a majority, the first device selects "1," thereby implementing a bit-wise majority vote to correct the assumed error in the packet. This majority process may be performed for each bit of a respective packet payload. As will be understood, a majority vote generally includes an odd number of "votes," such as a derived from a first, second, and third packet containing errors instead of just the two used in the example herein.

By performing this additional error correction step that involves leveraging the retransmission enhancement of eSCO in place of substituting a special communication designating silence for a second packet, the techniques may substantially improve the quality of communication over an eSCO link compared to the quality experienced over eSCO links that implement the standard eSCO substitution of the special silence communication for the erred second packet. Moreover, the error correction techniques described in this disclosure may be implemented to comply with existing Bluetooth™ protocol specifications and therefore do not require any substantive amendment of the Bluetooth™ specification. As a result, the techniques may be implemented in existing Bluetooth™ capable devices without encountering Bluetooth™ compliance issues.

While the techniques are described in this disclosure with respect to the Bluetooth™ protocol specification for purposes of illustration, the techniques may be implemented with respect to any form of communication that relies on retransmission for overcoming communications received with detected errors. In this and many other aspects, the techniques should not be limited to the example set forth below.

FIG. 1 is a block diagram illustrating an example wireless communication system 10 that implements the techniques described in this disclosure. Wireless communication system 10 includes a mobile device 12 (a communication device) and a wireless personal area network device 14 ("WPAN device 14"—another communication device). Mobile device 12 comprises one or more of a cellular telephone (including so-called "smart" phones), a wireless telephone, a laptop computer, a personal digital assistant (PDA), a so-called "netbook," a portable or personal media player (including so-called "MP3" players), or any other device of a portable nature capable of implementing a wireless communication protocol or standard. While described with respect to mobile device 12, the techniques may be implemented with respect to non-mobile or less portable devices, such as desktop computers, workstations, non-portable media players (including wired media players, such as digital video disc players, Bluray™ disc players, and audio/video receivers), televisions, or any other device of a non-mobile or less portable devices capable of implementing a wireless communication protocol or standard.

WPAN device 14 may comprise any device capable of implementing a WPAN protocol, such as a Bluetooth™ protocol, infrared data association (IrDA) standards regarding infrared communications, and ultra-wideband (UWB) specifications. For illustrative purposes, it is assumed that WPAN device 14 implements the Bluetooth™ specification. Common WPAN devices 14 that implement the Bluetooth™ protocol include wireless headsets, wireless computer pointing devices (e.g., such as a mouse), wireless keyboards, and wireless stereo headphones.

Mobile device 12 includes a control unit 16 that implements the same WPAN protocol, e.g., one of the Bluetooth specifications, as that implemented by WPAN device 14. More specifically, control unit 16 includes WPAN module 18 that implements the same WPAN protocol, e.g., the Bluetooth™ specification, as that implemented by WPAN device 14. WPAN device 14 also includes a control unit 20 that implements the same WPAN protocol, e.g., the Bluetooth™ specification, as that implemented by mobile device 12. In particular, control unit 20 includes a WPAN module 22 that implements the same WPAN protocol, e.g., the Bluetooth™ specification, as that implemented by mobile device 12.

Each of mobile device 12 and WPAN device 14 implement the same WPAN protocol so as to "pair" with one another using procedures set forth in the Bluetooth™ specification. "Pairing" involves establishing a wireless communication channel or link 24 between each of WPAN modules 18 and 22. This wireless communication channel or link 24 represents a wireless communication medium. There are a variety of different types of links that WPAN modules 18 and 22 may establish, including asynchronous and synchronous links. WPAN modules 18 and 22 typically select the type of link based on the requirements of a particular application. For example, for voice applications, such as a voice over Internet Protocol (VoIP) application, WPAN modules 18 and 22 generally establish a synchronous link 24. For purposes of illustration, it is assumed that WPAN modules 18 and 22 establish a synchronous wireless communication link 24. The techniques of this disclosure, however, should not be limited to synchronous wireless communication link 24.

The Bluetooth™ specification provides for different types of synchronous wireless communication links. A first type referred to as a synchronous connection oriented (SCO) link involves transmitting data units over the SCO link that include limited error correction. In instances where the error correction for the SCO link is insufficient to correct the error, SCO links provide a special "silence" data unit for use in replacing the erred data unit. The "silence" data unit, when applied to auto data units, represents silence in the audio stream being communicated between the two WPAN devices. Originally, silence was perceived as an improvement over an erred data unit. However, as noted above, the Bluetooth™ specification was revised to include a different type of synchronous wireless communication link, referred to as an extended synchronous connection oriented (eSCO) link in the Bluetooth™ specification.

These eSCO links provided for a retransmission mechanism to account for erred data communications and only indicates silence as a last resort. To illustrate, upon detecting errors in a data unit where the limited error correction proved insufficient to correct the errors, those WPAN devices that adhered to the revised Bluetooth specification requested retransmission of the data unit. If the receiving WPAN device detected uncorrectable errors in the retransmitted data unit, this device would then request retransmission once again of the data unit. If the receiving WPAN device once again detected uncorrectable errors in the retransmitted data unit, the WPAN device would only then replace the data unit with the special "silence" data unit. The data unit typically comprises a packet containing audio data, but may comprise any other type of application layer data.

Notably, the current version of the Bluetooth™ specification provides forward error correction (FEC) only for the header of the data unit and not for the actual payload where the audio or other data is stored. For the payload, the current version of the Bluetooth™ specification provides only for error detection through the use of a cyclic redundancy check (CRC). In this sense, the Bluetooth™ specification provides for "limited" error correction, as only errors in the header can be corrected while errors in the payload can only be detected. Thus, according to the Bluetooth™ specification, retransmission is the only means by which errors in the payload may be "corrected," where this form of correction is far different than the dynamic correction of the same data unit enabled through FEC. That is, FEC actually corrects the errors in the same data unit, while the retransmission corrects the errors of the current data unit by replacing the current data unit with another version of the data unit, which may or may not include errors.

Given the synchronous nature of these eSCO links, the Bluetooth™ specification provides for a limited time window in which each data unit may be sent between WPAN modules 18 and 22. Typically, this limited time window permits only two retransmissions of the data unit, meaning that WPAN module 22 may only request two retransmissions before having to flush the payload from the queue, which may be the same as replacing the data unit with the special "silence" data unit. Moreover, once this time expires (or, in other words, a "timeout" of a timer occurs), WPAN module 22 may not even response with an acknowledgement to the received data unit, as the synchronous nature of link 24 would require both of WPAN modules 18 and 22 to timeout at the same time and remain synchronous.

In accordance with the techniques described in this disclosure, WPAN device 14, which as described above may represent a Bluetooth™ headset, implements the eSCO aspect of the Bluetooth™ specification or protocol to request up to two retransmissions of a data unit or communication received over an eSCO link between WPAN device 14 and mobile device 12, which may represent a cellular or mobile phone. However, rather than simply replace the last data communication having an uncorrectable error with a special silence data unit or otherwise performing packet loss concealment, WPAN device 14 performs a bit-wise majority vote when appropriate on each of the bits of the separate versions of the same data communication. In addition, control unit 16 and control unit 20 may include a codec that may override the respective control unit's MAC module with regard to sending acknowledgments and non-acknowledgments as will be described in detail below.

To illustrate these techniques, consider that mobile device 12 initially pairs with WPAN device 14 to establish a synchronous wireless communication link 24, which is also referred to as eSCO link 24 for ease of reference. More particularly, WPAN module 18 of mobile device 12 pairs with WPAN module 22 of WPAN device 14. Mobile device 12 may initiate a voice telephone call either through the cellular network or through a data network, where in the instance of the data network the call represents a VoIP call. Alternatively, mobile device 12 may begin audio or video data playback or stream audio or video data from a wireless network. In any event, control unit 16 may access and decode media content 26, where control unit 16 stores media content 22 to a memory or other storage medium (not shown in FIG. 1). WPAN module 18 then begins transmitting this media content 26 via eSCO link 24 to WPAN module 22 of WPAN device 14, which may include other modules not shown in FIG. 1 for playing back the received media content.

In accordance with the Bluetooth specification, WPAN module 18 divides media content 22 into discrete data units, which are referred to in the Bluetooth™ specification as eSCO packets. While described with respect to eSCO packets, the techniques may apply to any data communication or data unit and should not be limited to eSCO packets. WPAN device 14 and, more particularly, WPAN module 22 of WPAN device 14 therefore receives a first eSCO packet over eSCO link 24 and performs error correction/detection to determine whether the first eSCO packet includes an error. If the first eSCO packet includes an error, WPAN module 22 may first attempt to correct the error. Assuming, however, that the error cannot be corrected, WPAN module 22 requests, in accordance with the Bluetooth™ specification, a first retransmission of the first eSCO packet received over the wireless communication medium, e.g., eSCO link 24, in response to detecting the error in the first eSCO packet. WPAN module 18 responds to this first retransmission request with another or second eSCO packet that is a duplicate or copy of the first eSCO packet from the perspective of WPAN module 18.

WPAN module 22 then receives another, or second, eSCO packet in response to this first requested retransmission from WPAN module 18. WPAN module 22 determines whether the second eSCO packet received in response to the first retransmission request includes an error. Assuming this second communication contains an error that cannot be corrected, a WPAN module 22 of WPAN device 14, rather than replace the second eSCO packet in an output buffer with the special communication designating silence, invokes majority vote (MV) module 28 ("MV module 28") when appropriate, where MV module 28 performs a bit-wise majority vote on corresponding bits of the first, second and third eSCO packets to generate at least a partially error-corrected eSCO packet. Next, a codec module determines if the error-corrected packet is acceptable. This determination may be based on a quality target that is dynamic. The quality target may be an audio quality, for example, and may be based on a past history of the link between the two devices used in a code error model. For example, if there are little errors in the link transmissions according to the past history, the codec error model may set the quality target for little or no errors in a packet. If, on the other hand, the past history shows more errors in the link transmissions, the codec error model may set the quality target for one or more errors per packet (i.e., more error tolerant) or the location of the error (i.e., apt-X packaging discussed below). The codec error model may also attempt to adjust the packet size, compression, etc. of future packet transmissions. However, when the packet parameters cannot be changed due to short time frames for low latency transmissions, the codec error model may adjust the quality target to increase the number of errors or the location of the errors that would still be determined to be acceptable for further processing and no retransmission or silence for that particular packet. MV module 28 represents a hardware or combination of hardware and software (e.g., a processor executing software stored to a computer-readable storage medium) module that implements various aspect of the bit-wise majority vote techniques described in this disclosure.

MV module 28 performs the bit-wise majority vote by comparing, for example, the first bit of a payload of each of the first and second (and third) eSCO packets, which for illustrative purposes may comprise bit values of 1 and 1 (and 0), respectively. As the two 1's form a majority, MV module 28 selects "1," thereby implementing a bit-wise majority vote to correct the assumed error (the "0" in the third packet) eSCO packet. MV module 28 continues on a bit-by-bit basis in the above manner to assess and correct those bits by way of the majority vote techniques described above. The partially error corrected eSCO packet if determined to be acceptable by the codec module may then forward to media content 26', which may be stored to a buffer, memory or other computer-readable storage medium. Media content 26' is denoted with a prime (') to suggest that it is a copy or near copy of media content 26 stored by control unit 16 of mobile device 12.

By performing these additional error correction steps that involve leveraging the retransmission enhancement of eSCO in place of substituting a special communication designating silence for the eSCO packet, the techniques may substantially improve the quality of communication over an eSCO link compared to the quality experienced over eSCO links that implement the standard eSCO silence substitution for the erred third eSCO packet. Moreover, the error correction techniques described in this disclosure comply with existing Bluetooth™ protocol specifications and therefore do not require any substantive amendment of the Bluetooth™ specification. As a result, the techniques of this disclosure may be implemented in existing Bluetooth™ capable devices without encountering Bluetooth™ compliance issues.

Figure 2:
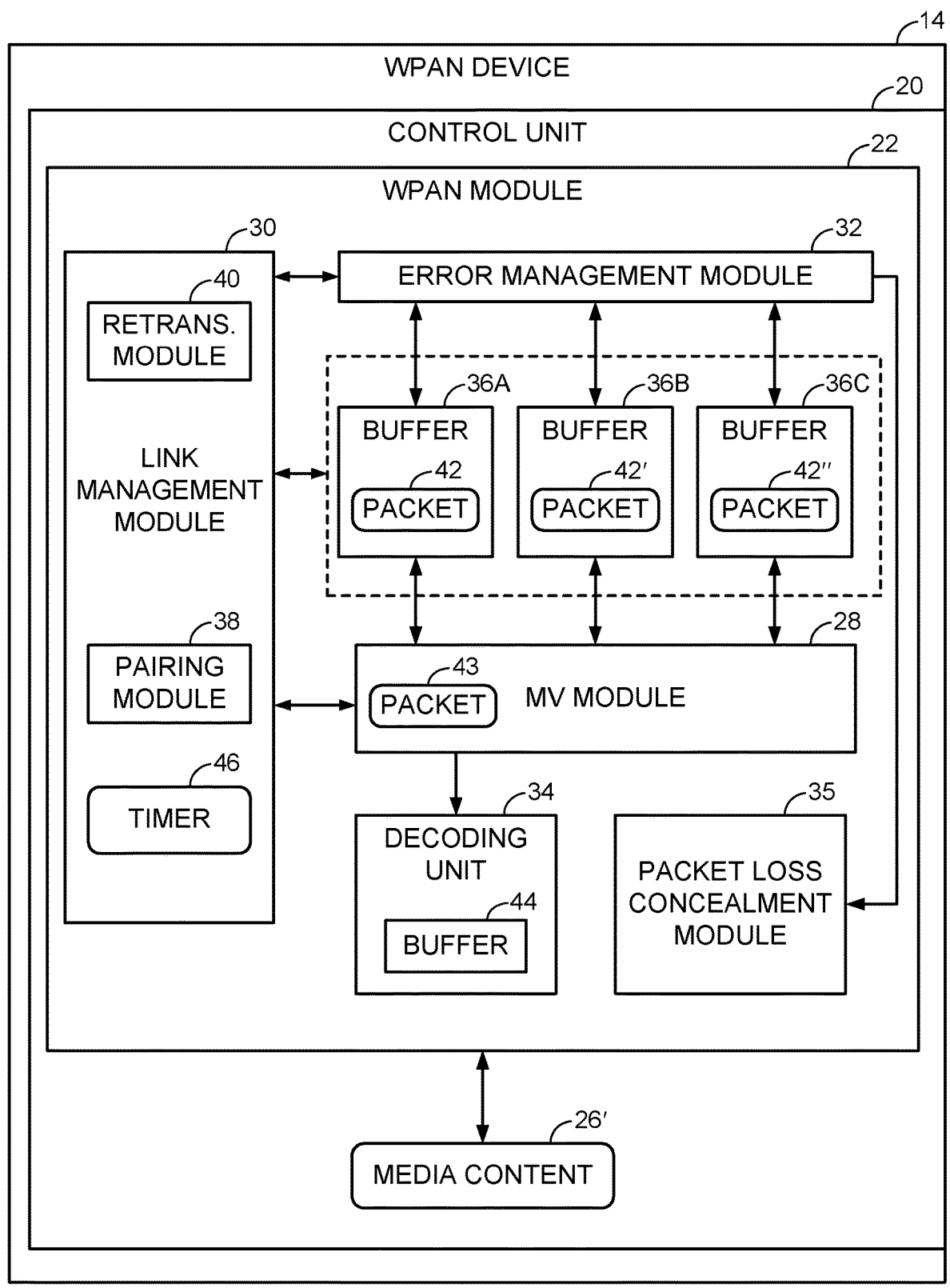
FIG. 2 illustrates an exemplary block diagram of a communication device in accordance with some examples of the disclosure.

FIG. 2 is a block diagram illustrating WPAN device 14 of FIG. 1 in more detail. As shown in FIG. 2, WPAN device 14 includes control unit 20 comprising WPAN module 22. WPAN module 22, as described above, includes MV module 28. WPAN module 22 however also includes a MAC module 30, error management module 32 with codec or decoder error model, decoding unit 34, packet loss concealment module 35 and buffers 36A-36C. MAC module 30 represents hardware or combination of hardware and software (e.g., a processor executing software stored to a computer-readable storage medium) that manages a link, such as eSCO link 24 shown in FIG. 1.

MAC module 30 includes a pairing module 38 and a retransmission module 40 ("retrains module 40"). Pairing module 38 represents a hardware or combination hardware and software (e.g., a processor executing software stored to a computer-readable storage medium) that "pairs" WPAN module 22 with WPAN module 18 so as to configure, establish, and maintain a link that is either asynchronous or synchronous (e.g., eSCO link 24). Retransmission module 40 represents hardware or combination of hardware and software (e.g., a processor executing software stored to a computer-readable storage medium) that issues requests for retransmission of a data unit or communication, such as an eSCO packet.

Error management module 32 represents hardware or combination of hardware and software (e.g., a processor executing software stored to a computer-readable storage medium) that performs error correction and detection with respect to received data units, such as eSCO packets as well as determines if an error-corrected packet is acceptable. Decoding unit 34 represents a module formed by hardware or a combination of hardware and software (e.g., a processor executing software stored to a computer-readable storage medium) that decodes payload data stored to payloads of eSCO packets to generate media content 26'. Packet loss concealment module 35 represents a hardware module or combination of hardware and software modules that performs packet loss concealment to conceal lost or corrupted packets. While not shown in FIG. 2, control unit 20 may include other modules, such as audio playback modules, for playing, rendering or otherwise playing back media content 26' for consumption by a user. These playback modules may comprise audio drivers, speakers and other audio playback components, as well as, displays and other video playback components.

Buffers 36A-36C ("buffers 36") represent hardware modules for storing data, such as eSCO packets. While shown as three separate buffers 36A-36C, a single memory module or disk drive may provide three separate logical, rather than physical, buffers. In this respect, buffers 36 represent any real or logical partitioning of memory or other computer-readable storage medium. Buffers 36 typically comprise small dedicated memories, such as Flash memory, random access memory (RAM), static RAM (SRAM), dynamic RAM (DRAM) or any other form of either static or dynamic memory.

Initially, a user or other operator of WPAN device 14 interacts with a user interface (not shown in FIG. 2) so as to cause pairing module 38 of MAC module 30 to begin broadcasting or otherwise transmitting inquiry messages on different frequencies. WPAN module 18 of mobile device 12 may receive these inquiry messages and present devices identified by the inquiry message to the user or operator via a user interface of mobile device 12 (which also is not shown in FIG. 1 or 2). The user may select which device form the list of devices learned via the inquiry messages with which the user wants to pair to mobile device 12. Assuming the user selects WPAN device 14, WPAN module 18 pairs with WPAN module 22, where pairing module 38 negotiates the pairing process to establish a link, such as eSCO link 24.

Once paired, WPAN module 18 of mobile device 12 transmits media content 26 via established eSCO link 24 by dividing media content 26 into discrete payloads and encapsulating these payloads with a header to form one or more eSCO packets. WPAN module 18 then transmits the eSCO packets via eSCO link 24 to WPAN module 22 of WPAN device 14. MAC module 30 of WPAN module 22 included within WPAN device 14 receives a first eSCO packet 42 of the plurality of eSCO packets sent by WPAN module 18. MAC module 30 stores eSCO packet 42 to buffer 36A and signals error management module 32. Error management module 32 parses the header from eSCO packet 42 stored to buffer 36A and determines whether the header contains any bit errors. If the header includes only a few bit errors, error management module 32 performs FEC to correct these errors. However, if the parsed header contains a number of errors over a FEC threshold, error management module 32 may be unable to correct these errors using FEC and instead signal MAC module 30 may request a retransmission of packet 42. MAC module 30 invokes retransmission module 40 to issue the request for retransmission of eSCO packet 42.

Assuming, however, that error management module 32 does not detect any errors in the header, error management module 32 next determines whether the payload of eSCO packet 42 contains any errors. Generally, eSCO packets, such as eSCO packets 42 provide a CRC checksum that error management module 32 utilizes to determine whether eSCO packets contain errors. If packet 42 does not include any errors, error management module 32 writes packet 42 to buffer 44 of decoding unit 34, whereupon decoding unit 34 decodes packet 42 and stores this packet as a portion of media content 26'. Buffer 44 may be substantially similar to buffers 36. In some instances, buffer 44 may be the same as buffer 36A in that this buffer 36A is the buffer that decoding unit 34 accesses to decode packets. In any event, if error management module 32 determines that packet 42 contains errors using the CRC, error management module 32 signals MAC module 30, which invokes retransmission module 40 to request retransmission of eSCO packet 42.

Assuming for illustrative purposes that eSCO packet 42 contains a payload bit error and consequently that retransmission module 40 requested retransmission of eSCO packet 42, WPAN module 18 of mobile device 12 retransmits eSCO packet 42, where this retransmitted copy or duplicate of eSCO packet 42 is denoted as eSCO packet 42'. MAC module 30 receives eSCO packet 42' and stores this eSCO packet 42' to buffer 36B. Error management module 32 then performs the above described process to determine whether packet 42' includes any uncorrectable errors, which may comprise a number of bit errors in the header that exceed the FEC threshold and/or any bit errors in the payload, considering the payload CRC does not permit correction. If no uncorrectable errors exist in packet 42', error management module 32 writes packet 42' to buffer 44 of decoding unit 34, whereupon decoding unit 34 decodes packet 42' and stores this packet as a portion of media content 26'.

Assuming once again however that eSCO packet 42' contains payload bit error, error management module 32 interacts with MAC module 30 to signal or flag the uncorrectable error. MAC module 30, as described above, may invoke retransmission module 40, which requests retransmission of packet 42. Alternatively, the error management model may skip the second retransmission and proceed with majority voting and determining if the error corrected packet is acceptable. In response to this second retransmission request, WPAN module 18 of mobile device 12 retransmits eSCO packet 42, where this retransmitted copy or duplicate of eSCO packet 42 is denoted as eSCO packet 42". MAC module 30 receives eSCO packet 42" and stores this eSCO packet 42" to buffer 36C. Error management module 32 then performs the above described process to determine whether packet 42" includes any uncorrectable errors. If no uncorrectable errors are found to exist in packet 42", error management module 32 writes packet 42" to buffer 44 of decoding unit 34, whereupon decoding unit 34 decodes packet 42" and stores this packet as a portion of media content 26'.

Yet again assuming for purposes of illustration that eSCO packet 42" is found to have at least one uncorrectable payload bit error, error management module 32 then determines whether each of packets 42, 42' and 42" are valid. The packets 42, 42' and 42" are valid if they contain only uncorrectable payload bit errors. For other uncorrectable errors, such as bit errors in the header that cannot be corrected using FEC or other error correction techniques, error management module 32 may determine that application of the majority vote techniques is not appropriate due to the high level of errors (as noted by the uncorrectable nature of the header bit errors). That is, the high level of errors refers to uncorrectable errors in the headers of the packets. Rather than invoke MV module 28 to apply the majority vote techniques described in this disclosure, error management module 32 may signal a packet loss and interact with packet loss concealment module 35 to conceal the lost packet. Packet loss concealment module 35 may, for example, generate a special silence packet to conceal the lost packet. Alternatively, packet loss concealment module 35 may generate a copy of a preceding packet to conceal the lost packet.

However, if each of packets 42, 42' and 42" are valid (e.g., do not contain uncorrectable header bit errors), error management module 32 may interact with MV module 28 to signal the uncorrectable state of all three of the payloads of packets 42, 42' and 42". MV module 28 then performs a bit-wise majority vote on each successive bit of packets 42, 42' and 42" to generate an at least partially error free packet 43. The following Table 1 provides an example of an application of the bit-wise majority vote techniques employed by MV module 28 to generate packet 43:

TABLE 1

| | Example Bit-Wise Majority Vote | | | | | | | |
|---|---|---|---|---|---|---|---|---|
| | Bit-0 | Bit-1 | Bit-2 | Bit-3 | Bit-4 | Bit-5 | Bit-6 | *** | Bit-N |
| Packet 42 | 0 | 1 | 1 | 0 | 1 | 0 | 0 | *** | 1 |
| Packet 42' | 0 | 1 | 0 | 0 | 1 | 1 | 0 | *** | 0 |
| Packet 42" | 0 | 1 | 0 | 0 | 1 | 0 | 0 | *** | 0 |
| Majority | 0 | 1 | 0 | 0 | 1 | 0 | 0 | *** | 1 |
| Packet 43 | 0 | 1 | 0 | 0 | 1 | 0 | 0 | *** | 1 |

In the above Table 1, each of packets 42, 42', 42" and 43 includes bits 0-N. Packet 42 includes bits from 0 to N with values of 0110100 . . . 1. Packet 42' includes bits 0 to N with values of 0100110 . . . 0. Packet 42" includes bits 0 to N with values of 0100100 . . . 0. MV module 28 performs the bitwise majority vote by taking the values of each bit, such as bit-0, of each of packets 42, 42' and 42" and counting the number of bit values that are 0 and the number of bit values that are 1. In the instance of bit-2, for example, the majority bit value is 0, as there is only one bit-2 value that equals one while there are two or a majority of bit-2 values that equal zero. Consequently, MV module 28 selects the majority bit-2 value of zero as the "correct" bit-2 value for packet 43. This value is only "correct" in the sense that this value represents the correct majority. While not statistically common, it is possible that this value is incorrect bit-2 value as both packet 42' and 42" may contain a bit error at exactly the same location. For this reason, packet 43 is referred to as being an at least partially error free packet.

Next, a codec module of the error management module 32 determines if the error corrected packet 43 is acceptable based on a quality target. If the error corrected packet 43 is deemed acceptable by the codec module, the codec module may override the MAC module 30 to send an acknowledgment instead of a non-acknowledgment or request for retransmission.

In the event the codec module determines the packet 43 is acceptable, MV module 28 writes packet 43 to buffer 44 of decoding unit 34, which decodes packet 43 and stores this packet as a portion of media content 26'. The above described playback components may read streaming media content 26' and reproduce this content 26' for consumption by a user. As noted above, the techniques may substantially improve the quality of streaming audio playback while reducing retransmissions that consume bandwidth.

Figure 3:
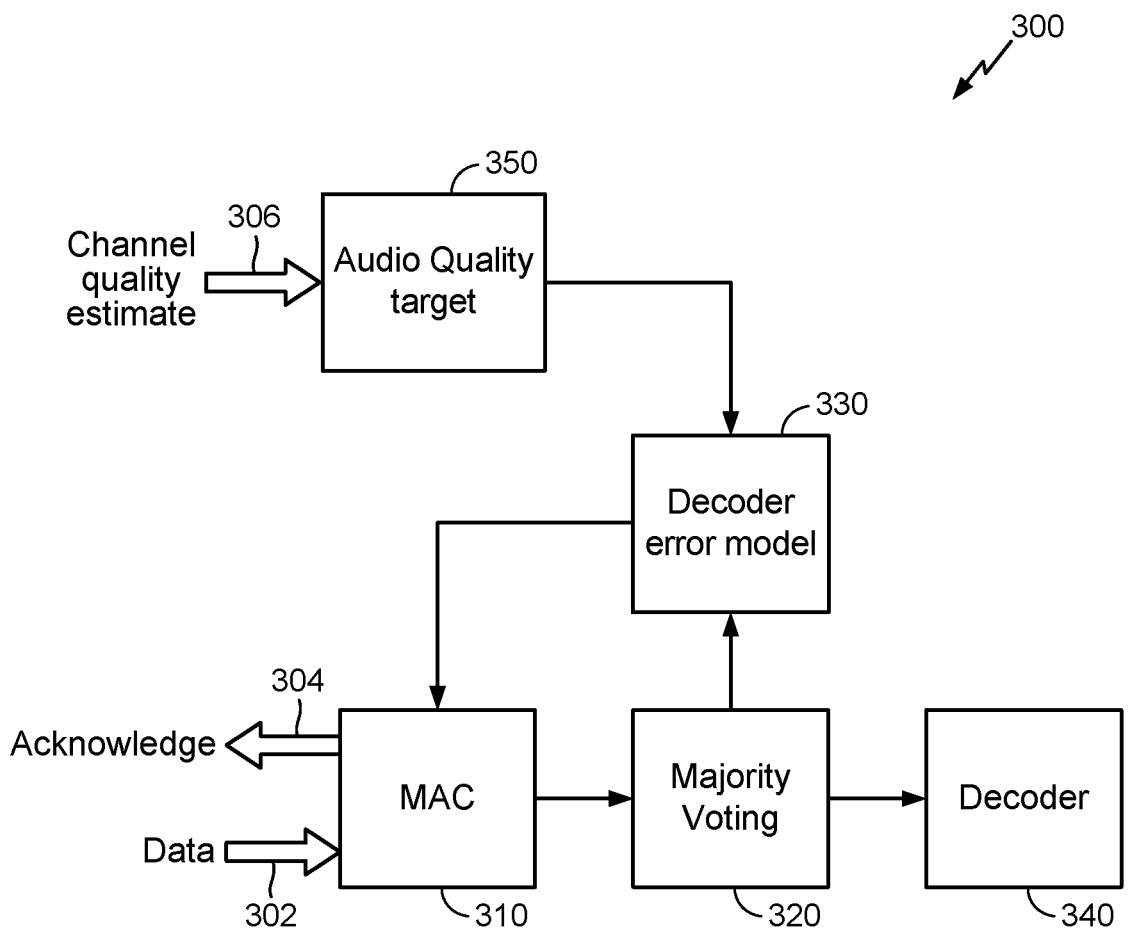
FIG. 3 illustrates an exemplary control unit in an access network in accordance with some examples of the disclosure.

FIG. 3 illustrates an exemplary control unit in an access network. As discussed above, normally the MAC acknowledgement scheme does not acknowledge the packet until the number of bit errors has reduced to zero and there is a good CRC. As a result, the source will keep sending packets until the maximum retries have been reached and therefore quickly using the bandwidth available. With a codec that is designed to be tolerant to bit errors the MAC acknowledgement scheme may consider codec packets as "acceptable" based on an error model of the codec. A bit error may not have effect or at worst have a small effect on the audio. This has an advantage in minimizing retransmissions that, in many cases, may be simply trying to get that last bit corrected. After receiving two packets, if that number of errors is small then there is no need to wait for a third packet.

A wireless communication medium can suffer periods of fading that reduces the bandwidth it can support. If more bandwidth is required than the medium can support, it will increase the channel latency and it will also affect the QoS of other communication links sharing the same controller. When low latency audio is required, any extra delay can cause audio dropout. Since there is a lag between the time the source will encode a packet of audio to when is it sent across the medium, this lag makes it hard for the source to reduce the bit rate of the encoded stream to match the instantaneous available bandwidth. Audio quality can be traded off against the wireless link bandwidth (bandwidth usually reserved for packet repeat) by allowing more bit errors to be kept in the stream fed to the codec module. This improves the latency that can be achieved but also the stability of the communication links.

As shown in FIG. 3, a communication device 300 (e.g., WPAN device 14) may include a MAC module 310 (e.g., MAC module 30), a majority voting module 320 (e.g., MV module 28), a codec module 330 (e.g., error management module 32), and a decoder module 340 (e.g., decoding unit 34). For Bluetooth ESCO/BLE streaming, it is possible to schedule the packet so that the receiver knows what slot it will be sent in and with Advanced Audio Distribution Profile (A2DP) the address fields can be protected with a CRC. This allows the communication device 300 to be confident that a packet 302 is addressed to it, even if there is a CRC error. The transmitter may attempt to send the packet 302 more than once while it is waiting for a MAC acknowledgement 304. For each transmission attempt that is received with a CRC error then a 'majority voting' by the majority voting module 320 is able to combine the received packets 302 to remove the bit errors. The process may continue until an attempt with a valid CRC is received, the majority voting module 320 is able to combine the attempts until the maximum number of attempts is exhausted. In addition, if the packets 302 are packaged with an apt-X adaptive that has been designed to be tolerant to bit errors, the codec module 330 may be able to partially decode the bit stream when errors occur. This allows a Bit Error Rate (BRE) to be traded off with an audio quality target 350. The MAC acknowledgement scheme can use a codec error model in codec module 330 to relate the bit errors to the audio quality target 350. For sort period disruption on the link, the average acknowledge 304 rate will increase. To counteract this increase, reducing the audio quality target 350 thereby reducing the average acknowledge 304 rate for these sort periods. The audio quality target 350 may increase again once the link has improved or the source has reacted. The audio quality target 350 may be adjusted based on a channel quality estimate 306 that is determined using the past history of the link and error rates on the link.

Figure 4:
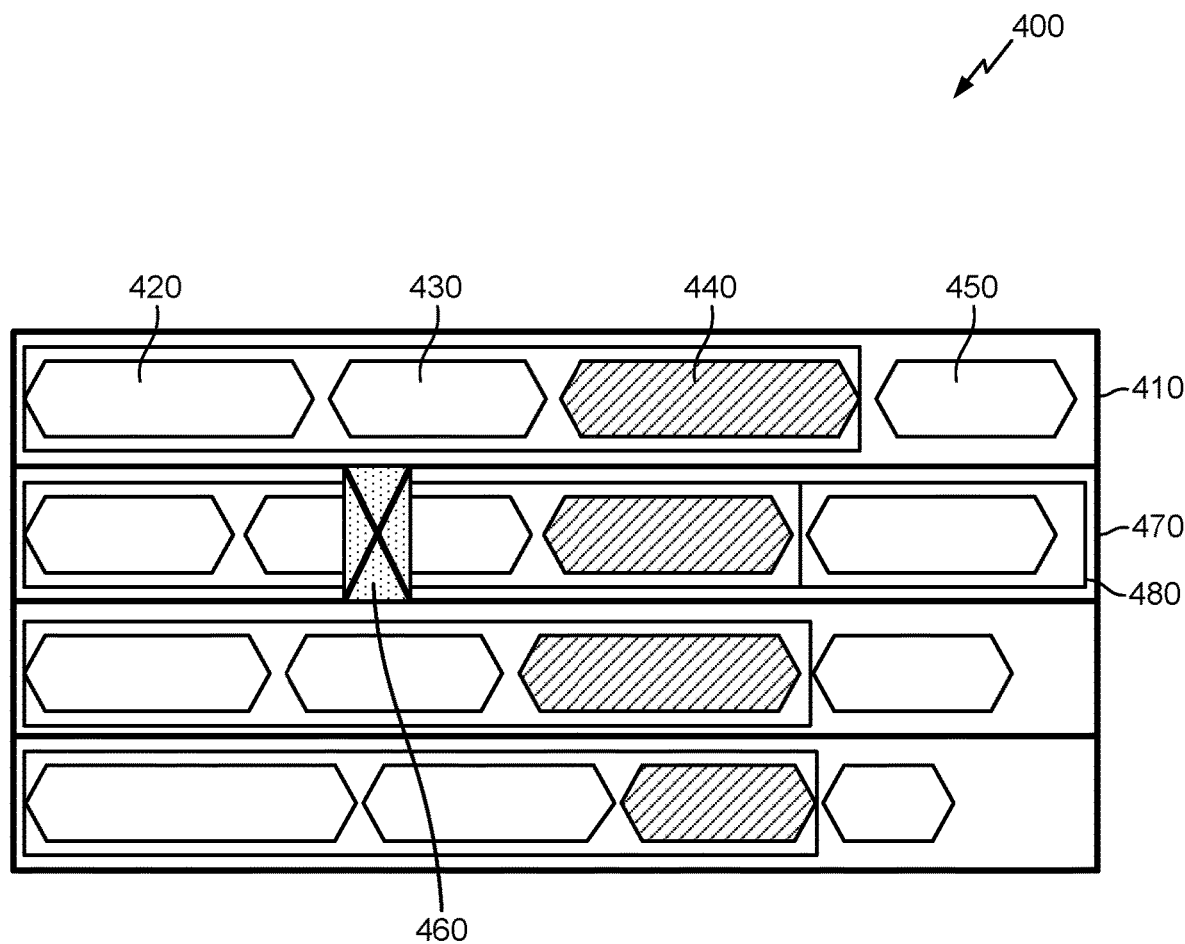
FIG. 4 illustrates an exemplary adaptive packaging scheme in accordance with some examples of the disclosure.

FIG. 4 illustrates an exemplary adaptive packaging scheme 400. As part of the error resilience, the data may be packed in intervals of 32 bits, where data is decoded from left to right as indicated in FIG. 4. As shown in FIG. 4, the data is packed into intervals with the first interval 410 having the most important packet. The first interval 410 may include a first band 420, a second band 430, a third band 440, and a fourth band 450 with the first band 420 being more important than the second band 430 etc. When a bit error 460 occurs in the second interval 470, it will affect extraction of the bits 480 in the second interval 470 after the bit error 460. This means that loss of data in the second interval 470 is akin to a reduction to the bitrate of the code. The decoder (e.g., decoder 340) may be able to self-correct bit errors in the most important bands—the first band 420, the second band 430, and the third band 440. A single bit error in any interval will not affect the audio if within an area that can be corrected. If it is later in the packet it will have least effect on the fourth band 450 that is not protected. Thus, the error model of the codec (e.g., codec module 333) may tolerate a maximum one-bit error in any 32 bit interval for the MAC to Acknowledge the packet. Further refinements include that the bit errors may be in the first 16 bits of the interval (as this will protect by the parity) and as the quality target (e.g., quality target 350) reduces, the scheme 400 allows for a single bit error moving in from the right. As the bands are packed in order of importance the further from the right side of the interval, the higher the probability of losing data significant data.

Figure 5:
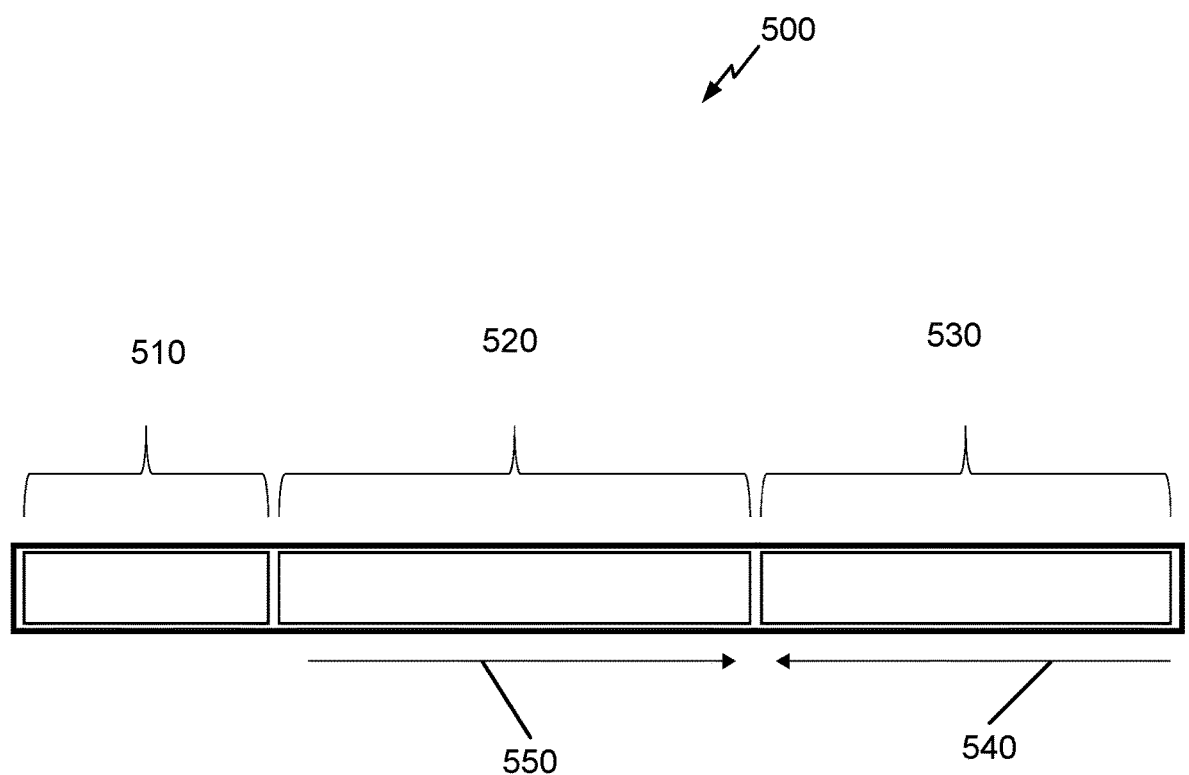
FIG. 5 illustrates an exemplary codec in accordance with some examples of the disclosure.

FIG. 5 illustrates an exemplary codec in accordance with some examples of the disclosure. As shown in FIG. 5, an exemplary packet 500 (e.g., eSCO packet) that may be used as a modified discrete cosine transform (MDCT) based codec may include a header 510, a range encoded data 520, and raw bits 530. The range encoded data 520 may store information that is not efficient to store as raw binary (as in a number of 2^N states) data. In the range encoded data 520, any data after the bit error cannot be read. The raw bits 530 may have fields of a known size such that the effect of a bit error will be localized and have a lower effect on the audio quality than the other location. Where the header 510 (which may include the energy for the bins) may be used to calculate the field sizes of both of the range encoded data 520 and the raw bits 530. Therefore, bit errors in the header 510 may mean that most data in the packet 500 is lost. The effect of audio quality on bit errors in the range encoded data 520 is proportional to the position of the error. As the closer to the end the error occurs, the less data will be lost. The packet 500 may be packed starting at the end in a first direction 540 for the raw bits 530 back to the end of the range encoded data 520 and a second direction 550 opposite the first direction 540 back to the start of the raw bits 530 for the range encoded data 520. This allows a decoder to rapidly switch between decoding symbols with the range coder and reading raw bits, without interleaving the data in the packet 500.

Figure 6:
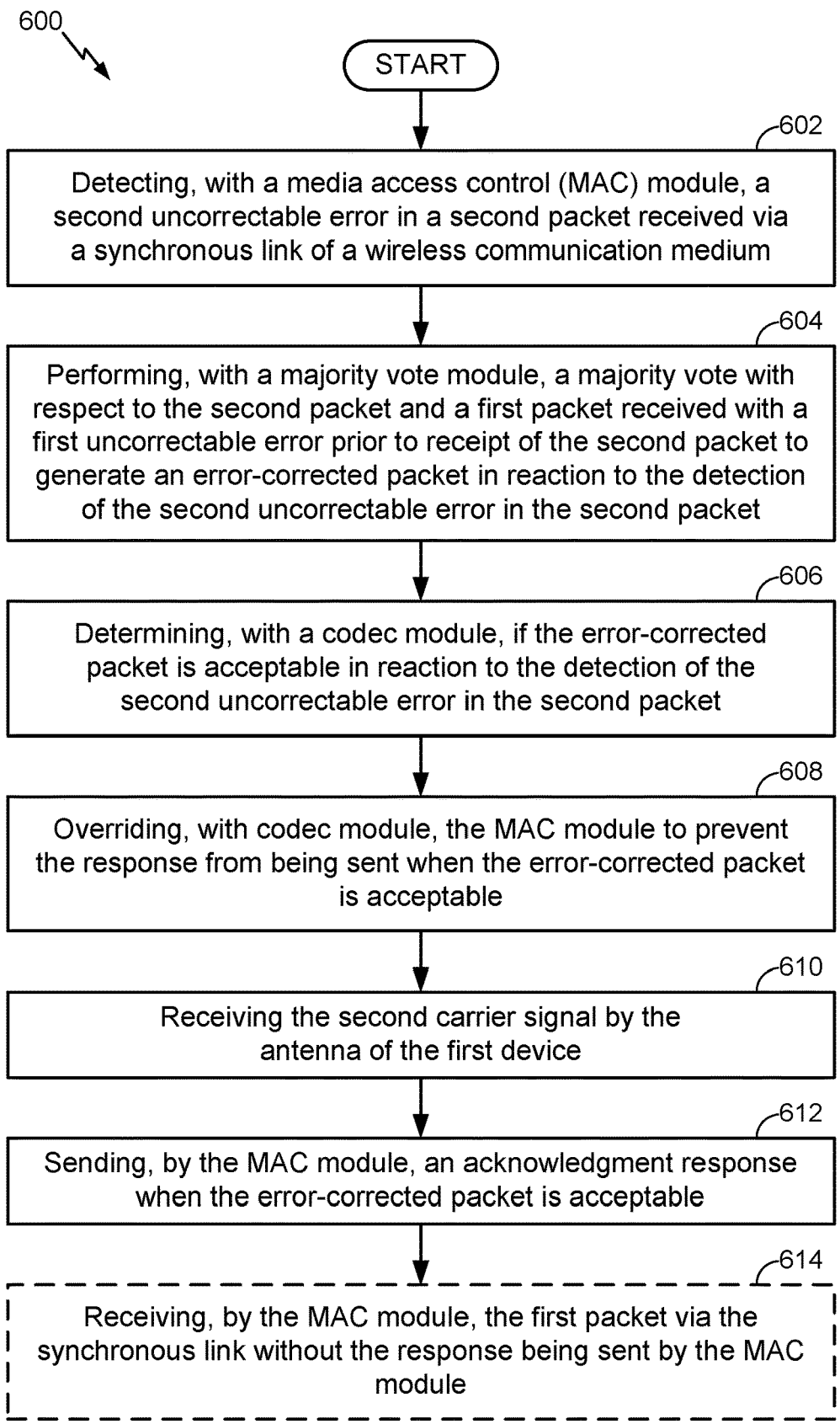
FIG. 6 illustrates an exemplary partial method for acknowledging a packet in accordance with some examples of the disclosure.

FIG. 6 illustrates an exemplary partial method for acknowledging a packet. As shown in FIG. 6, the partial method 600 begins in block 602 with detecting, with a media access control (MAC) module, a second uncorrectable error in a second packet received via a synchronous link of a wireless communication medium. The partial method 600 continues in block 604 with performing, with a majority vote module, a majority vote with respect to the second packet and a first packet received with a first uncorrectable error prior to receipt of the second packet to generate an error-corrected packet in reaction to the detection of the second uncorrectable error in the second packet. The partial method 600 continues in block 606 with determining, with a codec module, if the error-corrected packet is acceptable in reaction to the detection of the second uncorrectable error in the second packet. The partial method 600 continues in block 608 with overriding, with codec module, the MAC module to prevent the (e.g., non-acknowledgment) response from being sent when the error-corrected packet is acceptable. The partial method 600 concludes in block 610 with sending, by the MAC module, an acknowledgment response when the error-corrected packet is acceptable. Alternatively, the partial method 600 may conclude in block 612 with receiving, by the MAC module, the first packet via the synchronous link without the response being sent by the MAC module.

Figure 7:
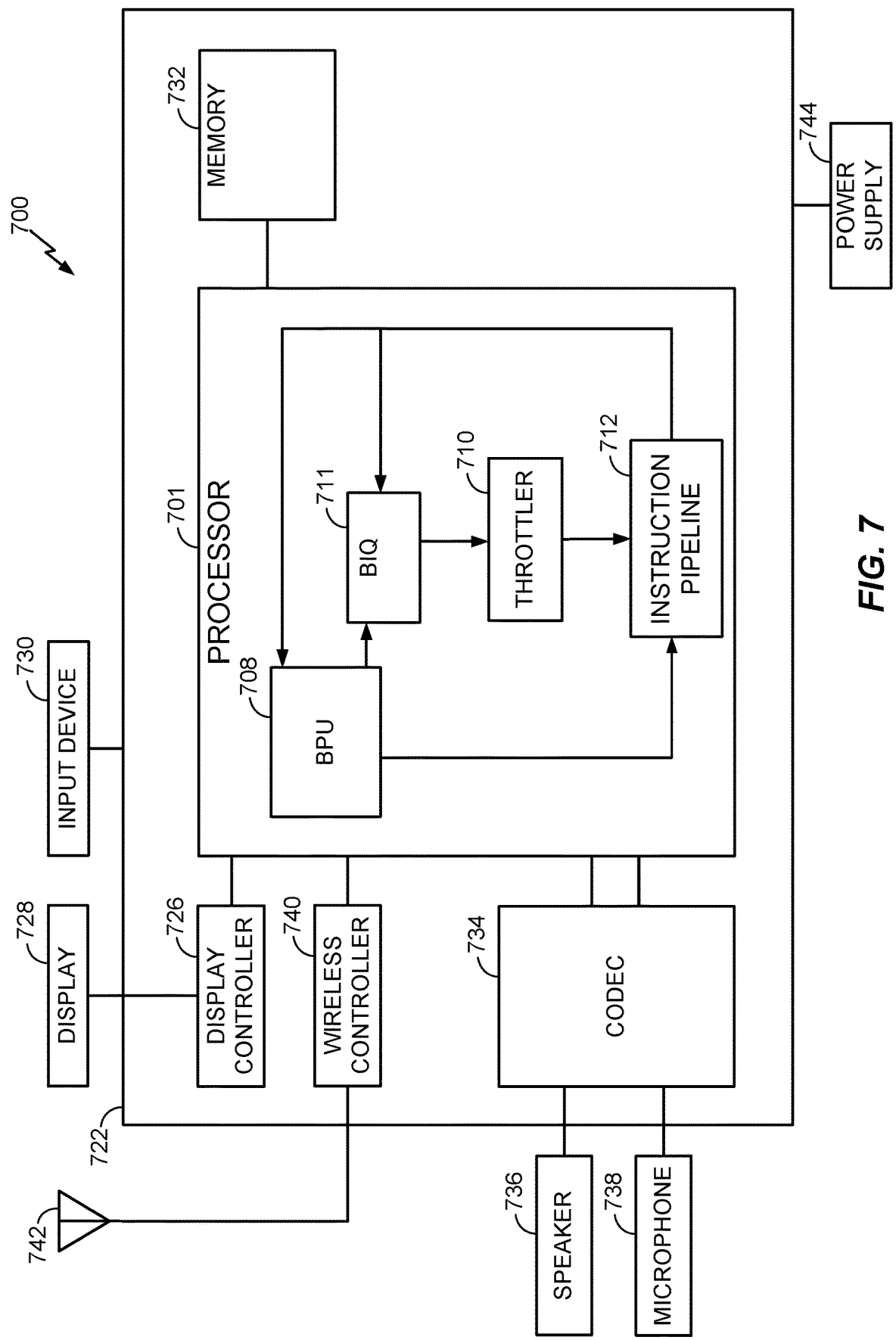
FIG. 7 illustrates an exemplary mobile device in accordance with some examples of the disclosure.

FIG. 7 illustrates an exemplary mobile device in accordance with some examples of the disclosure. Referring now to FIG. 7, a block diagram of a mobile device that is configured according to exemplary aspects is depicted and generally designated 700. In some aspects, mobile device 700 may be configured as a wireless communication device. As shown, mobile device 700 includes processor 701, which may be configured to implement the methods described herein in some aspects. Processor 701 is shown to comprise instruction pipeline 712, buffer processing unit (BPU) 708, branch instruction queue (BIQ) 711, and throttler 710 as is well known in the art. Other well-known details (e.g., counters, entries, confidence fields, weighted sum, comparator, etc.) of these blocks have been omitted from this view of processor 701 for the sake of clarity.

Processor 701 may be communicatively coupled to memory 732 over a link, which may be a die-to-die or chip-to-chip link. Mobile device 700 also include display 728 and display controller 726, with display controller 726 coupled to processor 701 and to display 728.

In some aspects, FIG. 7 may include coder/decoder (CODEC) 734 (e.g., an audio and/or voice CODEC) coupled to processor 701; speaker 736 and microphone 738 coupled to CODEC 734; and wireless controller 740 (which may include a modem) coupled to wireless antenna 742 and to processor 701.

In a particular aspect, where one or more of the above-mentioned blocks are present, processor 701, display controller 726, memory 732, CODEC 734, and wireless controller 740 can be included in a system-in-package or system-on-chip device 722. Input device 730 (e.g., physical or virtual keyboard), power supply 744 (e.g., battery), display 728, input device 730, speaker 736, microphone 738, wireless antenna 742, and power supply 744 may be external to system-on-chip device 722 and may be coupled to a component of system-on-chip device 722, such as an interface or a controller.

It should be noted that although FIG. 7 depicts a mobile device, processor 701 and memory 732 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 8:
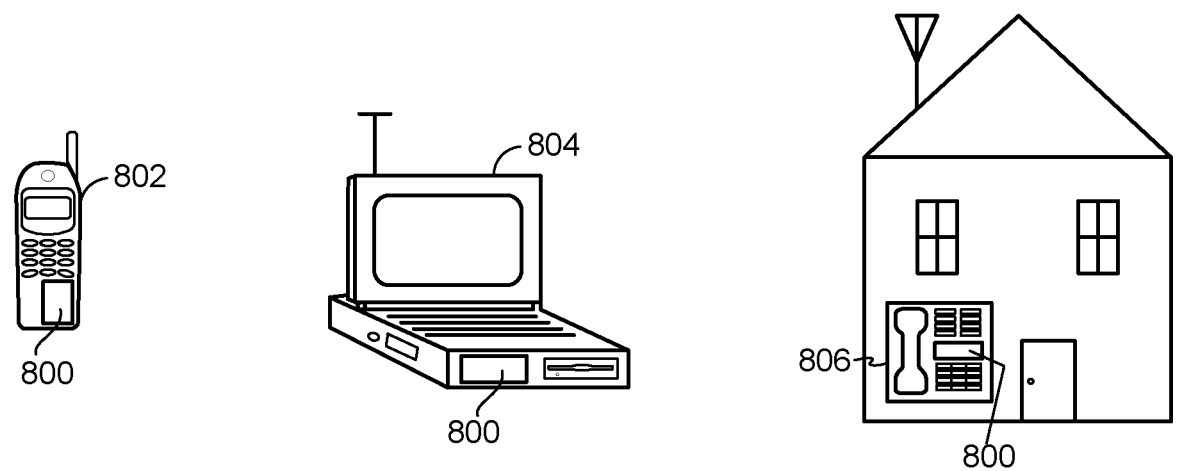
FIG. 8 illustrates various electronic devices that may be integrated with any of the aforementioned integrated device, semiconductor device, integrated circuit, die, interposer, package or package-on-package (PoP) in accordance with some examples of the disclosure.

FIG. 8 illustrates various electronic devices that may be integrated with any of the aforementioned integrated device, semiconductor device, integrated circuit, die, interposer, package or package-on-package (PoP) in accordance with some examples of the disclosure. For example, a mobile phone device 802, a laptop computer device 804, and a fixed location terminal device 806 may include an integrated device 800 as described herein. The integrated device 800 may be, for example, any of the integrated circuits, dies, integrated devices, integrated device packages, integrated circuit devices, device packages, integrated circuit (IC) packages, package-on-package devices described herein. The devices 802, 804, 806 illustrated in FIG. 8 are merely exemplary. Other electronic devices may also feature the integrated device 800 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art. It should furthermore be noted that methods, systems, and apparatus disclosed in the description or in the claims can be implemented by a device comprising means for performing the respective actions of this method. For example, in one aspect, a communication device (e.g., mobile device 12, WPAN device 14, communication device 300) may comprises: a control unit (e.g., control unit 16, control unit 20), the control unit comprises: means to control a media access control (MAC) layer (e.g., MAC module 30, MAC module 310) configured to send a response (non-acknowledgment response or acknowledgment response in A2DP) that requests a retransmission of a second packet received over a synchronous link of a wireless communication medium in response to a detection of a second uncorrectable error in the second packet received via the synchronous link; means to combine packets (e.g., MV module 28, majority voting module 320) configured to, in response to the detection of the second uncorrectable error in the second packet, perform a majority vote with respect to the second packet and a first packet received with a first uncorrectable error prior to receipt of the second packet to generate an error-corrected packet; and means to compress/decompress (e.g., error management module 32, codec error module 330) configured to, in response to the detection of the second uncorrectable error in the second packet, determine if the error-corrected packet is acceptable; wherein when the error-corrected packet is acceptable, the means to compress/decompress overrides the means to control the MAC layer to prevent the non-acknowledgment response from being sent and configures the means to control the MAC layer to send an acknowledgment response. It will be appreciated that the aforementioned aspects are merely provided as examples and the various aspects claimed are not limited to the specific references and/or illustrations cited as examples.

One or more of the components, processes, features, and/or functions illustrated in FIGS. 1-8 may be rearranged and/or combined into a single component, process, feature or function or incorporated in several components, processes, or functions. Additional elements, components, processes, and/or functions may also be added without departing from the disclosure. It should also be noted that FIGS.

1-8 and its corresponding description in the present disclosure is not limited to dies and/or ICs. In some implementations, FIGS. 1-8 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE), IEEE 802.11 (WiFi), and IEEE 802.15.4 (Zigbee/Thread) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations). Additionally, these sequence of actions described herein can be considered to be incorporated entirely within any form of computer-readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A communication device comprising:
   a control unit, the control unit comprises:
      a media access control (MAC) module configured to send a response that requests a retransmission of a second packet received over a synchronous link of a wireless communication medium in reaction to a detection of a second uncorrectable error in the second packet received via the synchronous link;
      a majority vote module configured to, in response to the detection of the second uncorrectable error in the second packet, perform a majority vote with respect to the second packet and a first packet received with a first uncorrectable error prior to receipt of the second packet to generate an error-corrected packet; and
      a codec module configured to, in response to the detection of the second uncorrectable error in the second packet, determine if the error-corrected packet is acceptable;
      wherein when the error-corrected packet is acceptable, the codec module overrides the MAC module to prevent the response from being sent and configures the MAC module to send an acknowledgment response.

2. The communication device of claim 1, wherein the MAC module is further configured to allow the MAC module to send the response when the error-corrected packet is not acceptable.

3. The communication device of claim 1, wherein the control unit further comprises a pairing module that establishes the synchronous link over the wireless communication medium to communicatively couple the communication device with another device.

4. The communication device of claim 1, wherein the MAC module receives the first packet via the synchronous link without the response being sent by the MAC module.

5. The communication device of claim 1, wherein the first packet comprises a first version of a protocol packet, wherein the protocol packet conforms to one of a Bluetooth specification, an extended synchronous connection oriented (eSCO), an Advanced Audio Distribution Profile (A2DP), a Transmission Control Protocol (TCP), a WiFi protocol, or an ultra-wide band (UWB) protocol, and wherein the second packet comprises a second version of the protocol packet.

6. The communication device of claim 5, wherein the MAC module comprises a pairing module to establish a link over the wireless communication medium between the device and another device, and wherein the MAC module receives the first and second versions of the protocol packet from the other device over the link, wherein the MAC module includes a retransmission module to request the first and retransmission of the protocol packet over the link.

7. The communication device of claim 6, wherein the protocol packet comprises a header field and a payload field, wherein the payload field stores error detection data that enables detection of bit errors in data stored to the payload field, and wherein the first and second uncorrectable errors each comprise one or more of a bit error in the data stored to the header field that cannot be corrected using the error correction data and a bit error in the data stored to the payload field detected using the error detection data.

8. The communication device of claim 1, wherein the control unit further comprises a decoding unit to decode payload data stored to a payload field of the error-corrected packet to generate media content.

9. The communication device of claim 1, wherein the communication device is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

10. A communication device comprising:
a control unit, the control unit comprises:
means to control a media access control (MAC) layer configured to send a response that requests a retransmission of a second packet received over a synchronous link of a wireless communication medium in reaction to a detection of a second uncorrectable error in the second packet received via the synchronous link;
means to combine packets configured to, in response to the detection of the second uncorrectable error in the second packet, perform a majority vote with respect to the second packet and a first packet received with a first uncorrectable error prior to receipt of the second packet to generate an error-corrected packet; and
means to compress/decompress configured to, in response to the detection of the second uncorrectable error in the second packet, determine if the error-corrected packet is acceptable;
wherein when the error-corrected packet is acceptable, the means to compress/decompress overrides the means to control the MAC layer to prevent the response from being sent and configures the means to control the MAC layer to send an acknowledgment response.

11. The communication device of claim 10, wherein the means to control the MAC layer is further configured to allow the means to control the MAC layer to send the response when the error-corrected packet is not acceptable.

12. The communication device of claim 10, wherein the control unit further comprises a means for pairing that establishes the synchronous link over the wireless communication medium to communicatively couple the communication device with another device.

13. The communication device of claim 10, wherein the means to control the MAC layer receives the first packet via the synchronous link without the response being sent by the means to control the MAC layer.

14. The communication device of claim 10, wherein the first packet comprises a first version of a protocol packet, wherein the protocol packet conforms to one of a Bluetooth specification, an extended synchronous connection oriented (eSCO), an Advanced Audio Distribution Profile (A2DP), a Transmission Control Protocol (TCP), a WiFi protocol, or an ultra-wide band (UWB) protocol, and wherein the second packet comprises a second version of the eSCO packet.

15. The communication device of claim 14, wherein the means to control the MAC layer comprises means for pairing to establish a link over the wireless communication medium between the device and another device, and wherein the means to control the MAC layer receives the first and second versions of the protocol packet from the other device over the link, wherein the means to control the MAC layer includes a retransmission module to request the first and retransmission of the protocol packet over the link.

16. The communication device of claim 15, wherein the protocol packet comprises a header field and a payload field, wherein the payload field stores error detection data that enables detection of bit errors in data stored to the payload field, and wherein the first and second uncorrectable errors each comprise one or more of a bit error in the data stored to the header field that cannot be corrected using the error correction data and a bit error in the data stored to the payload field detected using the error detection data.

17. The communication device of claim 10, wherein the control unit further comprises means for decoding to decode payload data stored to a payload field of the error-corrected packet to generate media content.

18. The communication device of claim 10, wherein the communication device is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

19. A method for acknowledging a packet, the method comprising:
detecting, with a media access control (MAC) module, a second uncorrectable error in a second packet received via a synchronous link of a wireless communication medium;
performing, with a majority vote module, a majority vote with respect to the second packet and a first packet received with a first uncorrectable error prior to receipt of the second packet to generate an error-corrected packet in reaction to the detection of the second uncorrectable error in the second packet;
determining, with a codec module, if the error-corrected packet is acceptable in reaction to the detection of the second uncorrectable error in the second packet;
overriding, with codec module, the MAC module to prevent a response from being sent when the error-corrected packet is acceptable; and
sending, by the MAC module, an acknowledgment response when the error-corrected packet is acceptable.

20. The method for acknowledging of claim 19, further comprising receiving, by the MAC module, the first packet via the synchronous link without the response being sent by the MAC module.

* * * * *